Dec. 30, 1947.  R. CHARTIER  2,433,545
TIRE CHAIN ASSEMBLY
Filed July 11, 1947
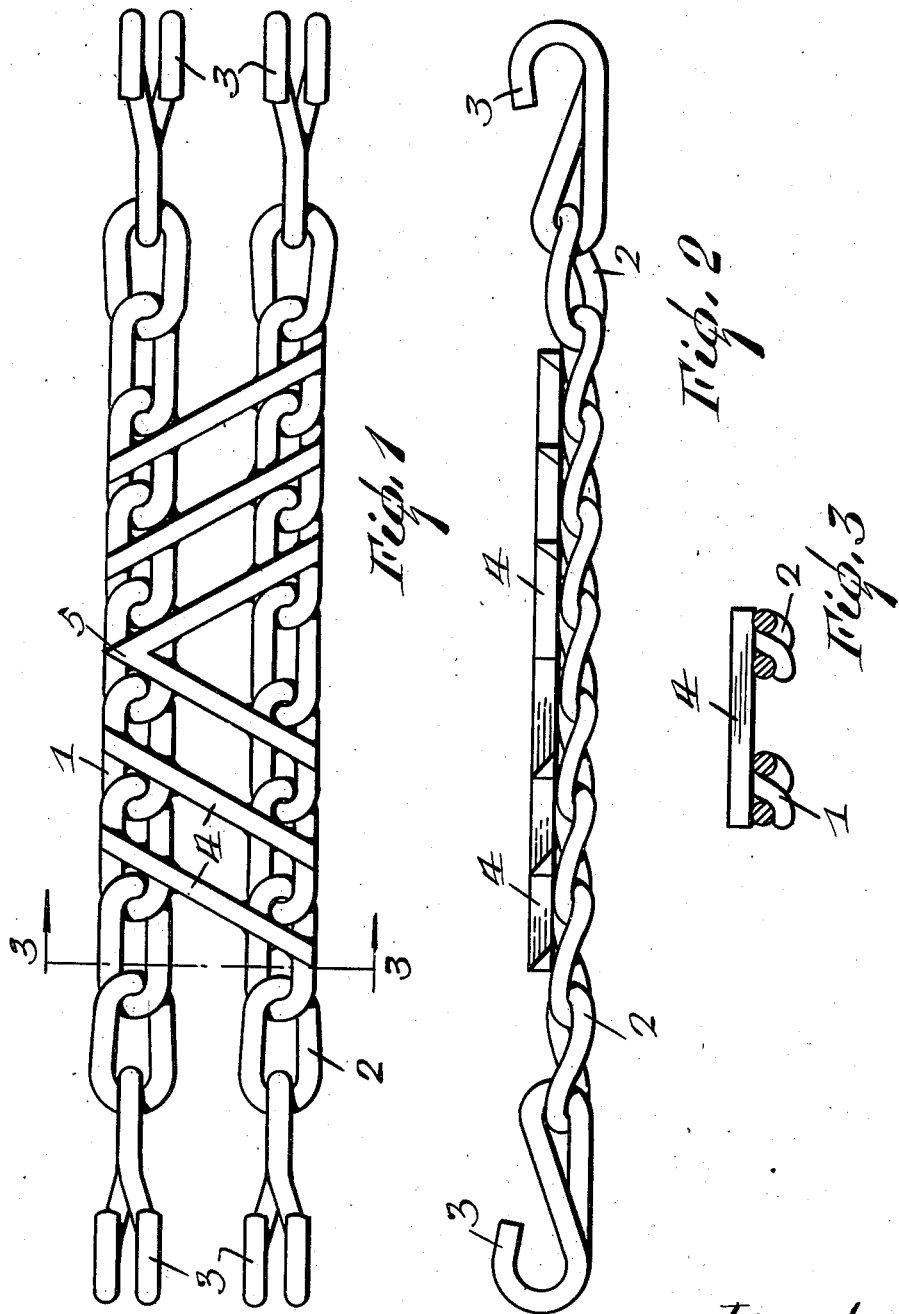
Inventor:
Richard Chartier
By [signature]
Attorney Patented Dec. 30, 1947

2,433,545

UNITED STATES PATENT OFFICE 2,433,545

TIRE CHAIN ASSEMBLY

Richard Chartier, Lac Masson, Quebec, Canada

Application July 11, 1947, Serial No. 760,465

3 Claims. (Cl. 152—225)

The present invention pertains to a novel chain for pneumatic tires. The principal object of the invention is to provide a simple and inexpensive device of this character that prevents skidding on slippery surfaces.

Another object of the invention is to provide a tire chain assembly in which the transverse members are permanently fastened to the side members, so that the several members cannot work loose from one another and need not be reassembled.

In the accomplishment of these objects, the two side chains are joined to one another by rigid transverse bars permanently secured thereto as by welding. The bars are preferably of triangular cross section so that each presents a sharp edge to the surface of the terrain, with the result that skidding becomes practically impossible. Further, the bars are arranged non-perpendicular to the side chains in order to provide greater traction length in each bar.

Although any desired or selected arrangement of the bars may be employed, in the preferred construction the two central bars form a V and the adjacent bars are respectively parallel to the sides of the V and spaced equi-distantly apart.

The invention is fully disclosed by way of example in the following description and in the accompanying drawings in which:

Figure 1 is a plan view of a stretched out tire chain according to the invention;

Figure 2 is a side elevation thereof; and

Figure 3 is a section on the line 3—3 of Figure 1.

Reference to these views will now be made by use of like characters which are employed to designate corresponding parts throughout.

In Figures 1 and 2 is illustrated a tire chain assembly according to the invention, comprising a pair of side chains in the usual manner. Ordinarily the side chains are joined to one another by short transverse chains, and it is herein that the invention differs from the conventional constructions. The side chains have a length equal to half the radial cross sectional circumference of the tire. In order to mount such unassembled chain, it is necessary to deflate the tire and then inflate it.

As already indicated, the invention pertains to the transverse elements of the assembly as illustrated herein. The longitudinal chains to be mounted circumferentially on the sides of the tires are indicated by the numerals 1 and 2 in Figure 1. In the stretched out condition of the assembly, as illustrated, the side chains are spaced apart and parallel to each other. The ends of these chains are hooked as indicated by the numeral 3, and the hooks of each chain are interengaged with one another in order to form a closed circle. The side chains are maintained in a circular form on the sides of the tire by means of transverse elements, as well known in the art.

In the present invention, the transverse elements consist of straight bars 4 welded or otherwise secured to the lengths of the chains 1 and 2. These bars are preferably of a right isoceles triangular cross section as may be seen by the ends thereof that appear in Figure 2.

The bars are preferably laid non-perpendicular to the chains 1 and 2. The preferred arrangement is shown in Figure 1 although the invention is not limited thereto. In this arrangement six bars are employed, and the two central bars form a closed angle or V having a vertex 5. The bars at each side of the angle are parallel to that side and spaced apart and equi-distant. It will be seen in Figure 1 that the ends of the bars are secured to the intermediate portions of the respective links, leaving the joined ends of the links free and thereby not interfering with the flexing of the chains 1 and 2 in circular form around the center of the tire.

As shown in Figure 2, one of the two perpendicular sides of each bar 4 is laid and secured on the chains 1, 2. Consequently, a sharp edge of each bar is exposed outermost and serves as an effective traction member to prevent skidding. The traction is further improved by the acute angular relation of the bars to the chains.

Inasmuch as the bars are rigid and lie on one surface of the chains, the latter rests at the sides of the tread which, in other words, is received between the chains. In the conventional construction, the side chains lie nearer the rim, but in the present construction the described position of the side chains is sufficient to prevent the assembly from slipping laterally off the tire.

Although a specific embodiment of the invention has been illustrated and described, it will be understood that various alterations in the details of construction may be made without departing from the scope of the invention as indicated by the appended claims.

What I claim as my invention is:

1. A tire chain assembly comprising a pair of spaced side chains, each having its ends adapted to be fastened together, and transverse rigid bars joining said chains and secured thereto, the two central bars forming a V, and the bars at the sides of said V being respectively parallel to said sides.

2. A tire chain assembly comprising a pair of spaced side chains, each having its ends adapted to be fastened together, and transverse rigid bars joining said chains and secured thereto, the two central bars forming a V, and the bars at the sides of said V being respectively parallel to said sides and equi-distantly spaced apart.

3. A tire chain assembly comprising a pair of spaced side chains, each having its ends adapted to be fastened together, and transverse rigid bars joining said chains and secured thereto, said bars being secured to the links of said chains at points free of the swivel connections between successive links, the two central bars forming a V, and the bars at the sides of said V being respectively parallel to said sides.

RICHARD CHARTIER.

REFERENCES CITED

The following references are of record in the file of this patent:

UNITED STATES PATENTS

| Number | Name | Date |
|---|---|---|
| 1,419,751 | Peak | June 13, 1922 |
| 1,599,583 | Newman | Sept. 14, 1926 |